United States Patent [19]
Iwata

[11] Patent Number: 5,473,603
[45] Date of Patent: Dec. 5, 1995

[54] SIGNALING SYSTEM UTILIZING SOURCE ROUTING INFORMATION IN A PACKET NETWORK

[75] Inventor: Atsushi Iwata, Tokyo, Japan

[73] Assignee: NEC Corporation, Tokyo, Japan

[21] Appl. No.: 251,276

[22] Filed: May 31, 1994

[30] Foreign Application Priority Data

May 31, 1993 [JP] Japan .................................. 5-128565

[51] Int. Cl.$^6$ .......................... H04L 12/24; H04L 12/56
[52] U.S. Cl. ........................................ 370/60; 370/68.1
[58] Field of Search ........................ 370/54, 58.1, 58.3, 370/60, 60.1, 68.1; 379/220, 229

[56] References Cited

U.S. PATENT DOCUMENTS

| | | | |
|---|---|---|---|
| 5,295,137 | 3/1994 | Jurkevich | 370/60 |
| 5,303,236 | 4/1994 | Kunimoto et al. | 370/68.1 |
| 5,357,508 | 10/1994 | Boudec et al. | 370/68.1 |

OTHER PUBLICATIONS

"ATM–LAN Protocol Architecture ATOM LAN", by Iwata et al., Technical Report of IEICE IN92–109, 1993–02, pp. 7–12.

"Draft Text for Q.93B", Working Party XI/6 of CCITT Study Group XI, pp. 1–72.

*Primary Examiner*—Benedict V. Safourek
*Attorney, Agent, or Firm*—Sughrue, Mion, Zinn, Macpeak & Seas

[57] ABSTRACT

For executing a signaling operation of a virtual channel which is used for communication between a transmission side and a reception terminal in a connection-oriented packet network, the transmission side acquires source routing information relating to a source route path between the transmission side and the reception terminal. The transmission side includes a transmission terminal and a switch between the transmission terminal and the reception terminal. With reference to the source routing information, the transmission terminal carries out a signaling operation of a setup for the virtual channel. It is preferable that the switch acquires the source routing information to transmit the source routing information to the transmission terminal. Alternatively, the transmission terminal may acquire the source routing information.

11 Claims, 7 Drawing Sheets

SIGNALING SYSTEM UTILIZING SOURCE ROUTING INFORMATION IN A PACKET NETWORK

BACKGROUND OF THE INVENTION

This invention relates to a signaling system for use in a connection-oriented packet network.

In a connection-oriented packet network known in the art, connection and disconnection between endpoints or terminals are carried out by the use of a control protocol which is generally called a signaling procedure in the art. A conventional signaling procedure has been created on the supposition that simple-functional terminals such as telephone sets are accommodated in the packet network. In the conventional signaling procedure, a number of messages must be exchanged. As a result, an operation of each of the connection and the disconnection is complicated and will hereunder be called a signaling operation. It is therefore difficult to establish the connection at a high speed. If the conventional signaling procedure is straightforwardly used in a high-performance network accommodating connectionless terminals such as computers, a connection delay becomes a serious problem for those software programs in which a response is required.

The above-mentioned control protocol is described in the CCITT recommendation "Draft Text for Q.93B" (pages 1 to 72) prepared in the Working Party XI/6 of the CCITT Study Group XI held in Geneva on Jun. 22 to 26, 1992.

In the CCITT recommendation Q.93B, a signaling operation is carried out by exchanging a series of messages. Specifically, those messages comprise six connection-establishing messages including a setup message, three connection-releasing messages including a disconnect message, and three other messages including a status message. Each message is composed of a common portion and a specific portion inherent to the message. The common portion comprises a protocol identifier, a call number, a message type, and so on. In order to establish connection, the above-mentioned connection-establishing messages are exchanged so that the terminals acquire a transmission virtual channel (VC) and an end-to-end communication route. Accordingly, even if the amount of transmission data is small, a processing delay and a propagation delay are not ignorable.

In order to perform the signaling operation at a high speed, it is necessary to minimize the processing delay in each switch which is included in the connection-oriented packet network in the manner known in the art. The processing delay is mainly caused by selection of the communication route. Therefore, it is desired to perform such selection at a high speed.

In the CCITT recommendation Q.93B, the setup message for establishment of connection contains a called party number and a called party subaddress in an information element so as to designate a called party to be connected. Supplied with the setup message, each switch decides a next route with reference to the called party number contained in the setup message. After the setup message reaches the called party address terminal, the signaling operation is carried out again by the use of the called party subaddress. Thus, selection of the route is carried out by the hop-by-hop signaling operation. When the multi-stage switches are passed, the processing time for selection of the route at each switch is increased and the end-to-end VC setup time is increased.

SUMMARY OF THE INVENTION

It is an object of this invention to provide a signaling system for use in a connection-oriented packet network having network structure, which is adaptable to variation of the network structure and which achieves establishment and teardown of connection at a high speed. Other object of this invention will become clear as the description proceeds.

According to an aspect of this invention, there is provided a system for executing a signaling operation of a setup for a virtual channel which is used for communication between a transmission side and a reception terminal in a connection-oriented packet network. In the system, the transmission side comprises information acquiring means for acquiring source routing information relating to a source route path between the transmission side and the reception terminal, and signaling means connected to the information acquiring means for carrying out the setup for the virtual channel with reference to the source routing information.

According to another aspect of this invention, there is provided a method of executing a signaling operation of a setup for a virtual channel which is used for communication between a transmission side and a reception terminal in a connection-oriented packet network. The method comprises steps of acquiring source routing information relating to a source route path between the transmission side and the reception terminal, and carrying out the setup for the virtual channel with reference to the source routing information.

DESCRIPTION OF THE PREFERRED EMBODIMENTS

Now, description will be made of a signaling system according to a first embodiment of this invention. The signaling system is for use in a connection-oriented packet network and has a signaling operation for each of connection and disconnection between a transmission and a reception terminal of the packet network in the manner known in the art.

For a better understanding, the signaling system will at first be described as an outline thereof. Upon carrying out the signaling operation, the transmission terminal designates the reception terminal by a destination address assigned thereto. The destination address is converted by a first-stage switch into source routing information indicative of a route or a source route path from the transmission terminal to the reception terminal. Such source routing information may be a list of port numbers of physical output ports of those switches to be used. In each of subsequent-stage switches, selection of the route is carried out at a high speed by the use of the source routing information. In other words, it is unnecessary for each subsequent-stage switch to refer to a routing table utilizing the destination address.

Figure 1:
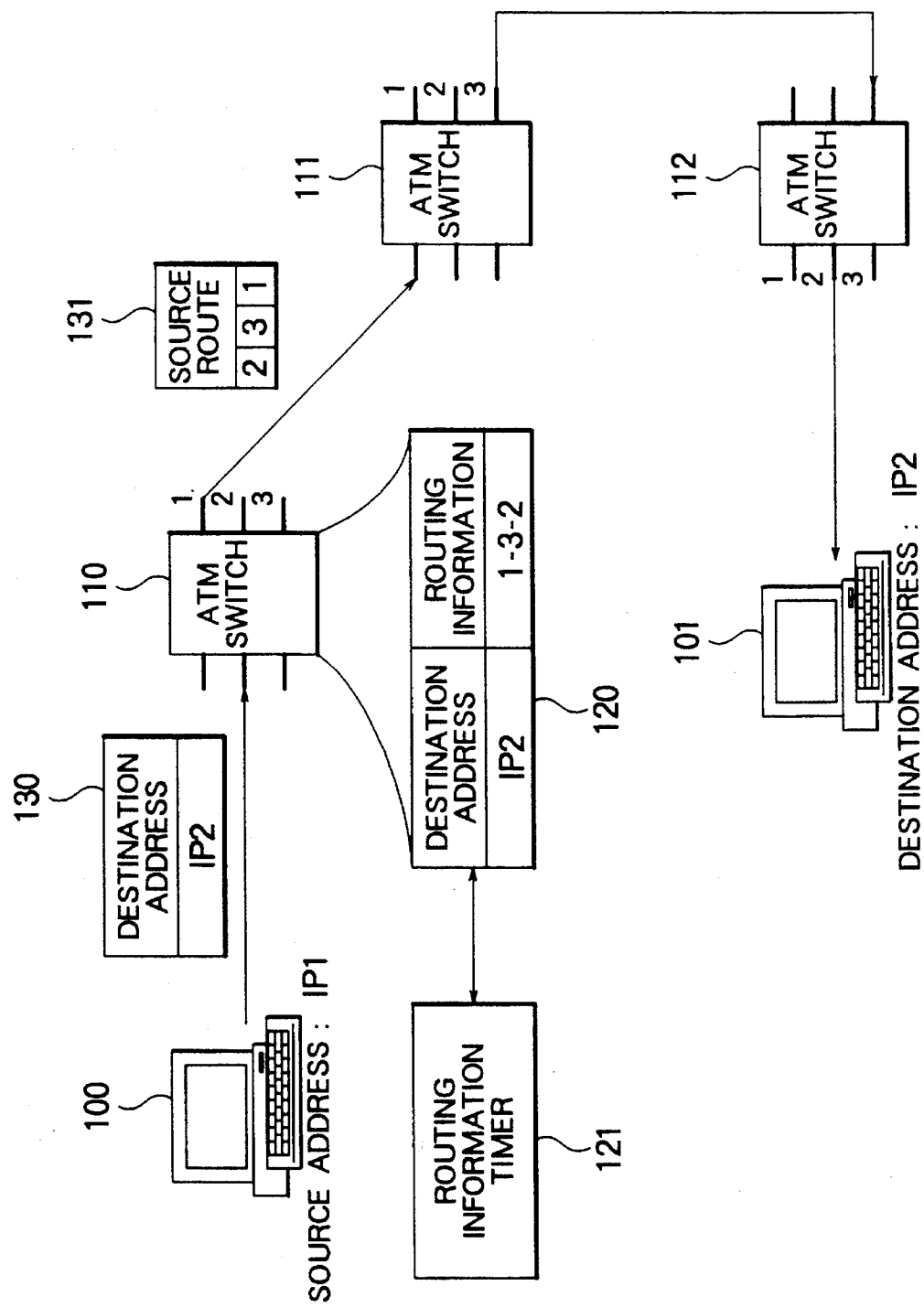
FIG. 1 is a view illustrating a signaling system according to a first embodiment of this invention.

Referring to FIG. 1, detailed description will be made as regards a case where a packet is transmitted from a transmission terminal 100 having a source address IP1 to a reception terminal 101 having a destination address IP2. The transmission terminal 100 starts the signaling operation in absence of a virtual channel (VC) leading to the reception terminal 101. In this event, the transmission terminal 100 is referred to as a signaling arrangement. Specifically, the transmission terminal 100 produces a signaling packet 130 as an original signaling packet and transmits the signaling packet 130 to a first-stage ATM switch 110. The signaling packet 130 designates the destination address IP2. A combination of the transmission terminal 100 and the first-stage ATM switch 110 is referred to as a transmission side.

The first-stage ATM switch 110 has a reference table 120 indicating source routing information corresponding to destination addresses. Supplied with the signaling packet 130, the first-stage ATM switch 110 checks the reference table 120 to search particular source routing information corresponding to the destination address IP2. The first-stage ATM switch 110 will be referred to as a producing arrangement. Dependent upon presence or absence of the particular source routing information, the first-stage ATM switch 110 carries out one of a first and a second specific step which will now be described with reference to FIG. 3.

First Specific Step

Figure 3:
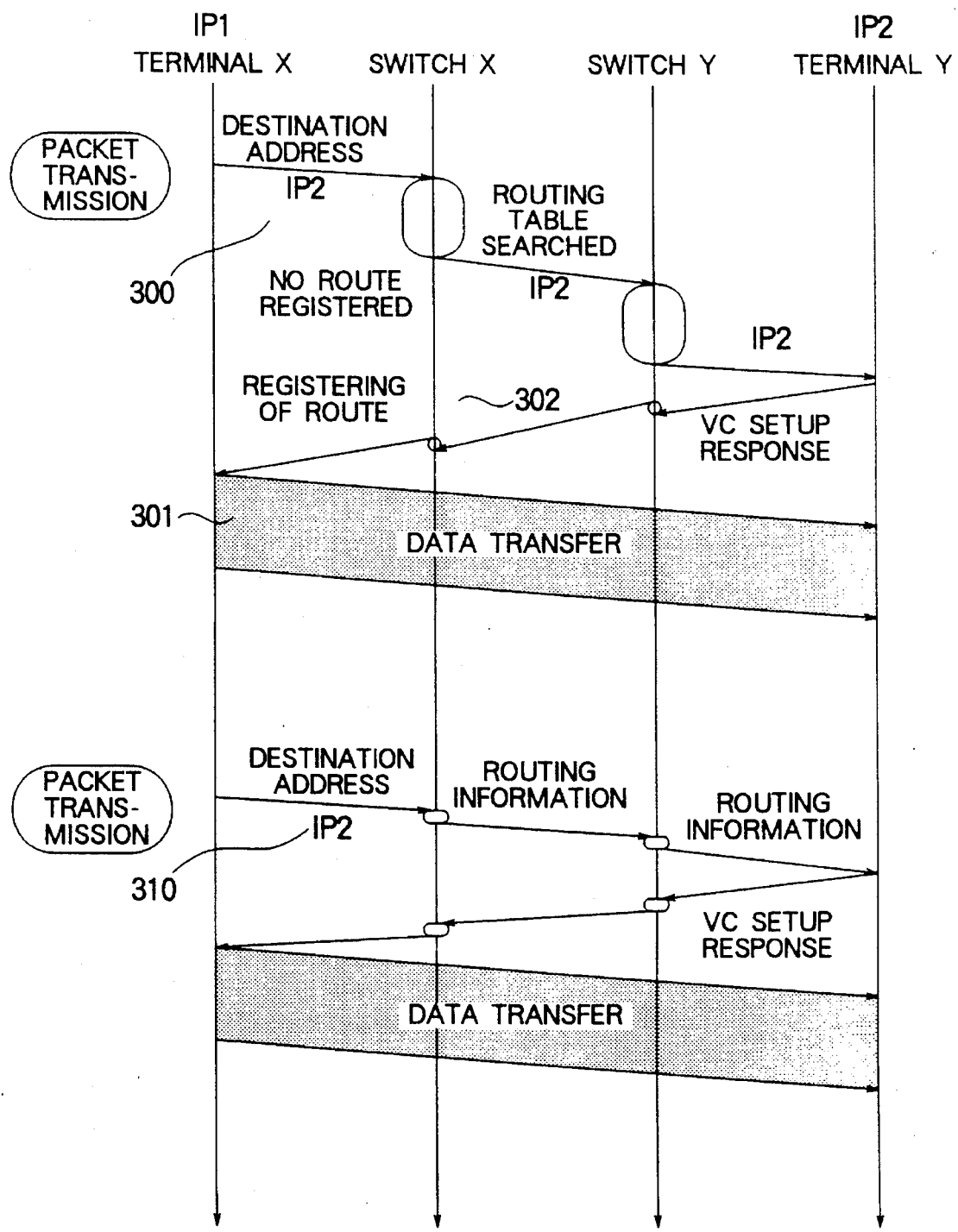
FIG. 3 is a flow chart for describing the signaling system illustrated in FIG. 1.

In FIG. 3, a packet flow chart 300 illustrates a case where the reference table 120 has no source routing information corresponding to the destination address IP2. In this event, the first-stage ATM switch 110 (corresponding to a switch X in FIG. 3) transfers the signaling packet 130 to a next switch (corresponding to a switch Y in FIG. 3) such as a second-stage ATM switch 111 and a third-stage ATM switch 112. A combination of the second-stage and the third-stage ATM switches 111 and 112 will be referred to as a transmitting arrangement. Herein, a conventional hop-by-hop routing operation is carried out according to the CCITT recommendation Q.93B to set up a virtual channel and a band for each of terminal-to-switch and switch-to-switch links. The signaling packet 130 is sent through a route thus established to reach the reception terminal 101 (corresponding to a terminal Y in FIG. 3). Then, a VC setup response is produced and sent back to the transmission terminal 100 (corresponding to the terminal X in FIG. 3).

Supplied with the VC setup response, the transmission terminal 100 transmits a data packet to the reception terminal 101 by the use of the virtual channel and the band thus assigned, as depicted by a packet flow chart 301.

With the above-mentioned signaling operation, the source routing information is obtained. The source routing information relates to the route between the transmission and the reception terminals 100 and 101. More particularly, the source routing information indicates which physical output ports of the first-stage through the third-stage ATM switches 110, 111, and 112 are selected as the route from the first-stage ATM switch 110 to the reception terminal 101. The source routing information is expressed in the form of a combination of port numbers of the output ports. Herein, the route successively passes through the port 1, the port 3, the port 2 and the source routing information is represented as "1-3-2". The source routing information is written in a routing information section in the reference table 120 of the first-stage ATM switch 110 as illustrated in a packet flow chart 302.

There are a first, a second, and a third acquiring approach to acquire the source routing information indicating which output ports of which switches are successively passed. In each of the first, the second, and the third acquiring approaches, each of the switches 110, 111, and 112 is referred to as an information acquiring arrangement in the manner which will be described in the following.

In the first acquiring approach, such output port information is acquired at each switch as a result of routing according to a hop-by-hop signaling operation and is added to the signaling packet and transferred to the next switch where the signaling operation is continued. When the signaling packet is delivered to the reception terminal 101, the source routing information alone is sent back from the reception terminal 101.

In the second acquiring approach, after completion of the signaling operation from the transmission terminal 100 to the reception terminal 101, the output port information of the switches on the route is successively acquired along with an acknowledgement delivered from the reception terminal 101 to the transmission terminal 100. Thus, the source routing information is notified.

In the third acquiring approach, each switch supplies another switch with the relationship between the addresses of those terminals and the port numbers of those ports accommodated in the switch. Thus, the state of connection between the terminals and the switches can be obtained. For example, the OSPF (Open Shortest Path First) system is known in the art. The route leading to the reception terminal is determined in accordance with the state of connection.

Second Specific Step

A packet flow chart 310 illustrates another case where the reference table 120 has the particular source routing information corresponding to the destination address IP2. In this event, the first-stage ATM switch 110 replaces the destination address IP2 in the signaling packet 130 by the particular source routing information (for example, the list of the port numbers of the physical output ports of the switches) to produce a transferred signaling packet 131 which is transferred to the subsequent switch. In the above-mentioned manner, selection of the route is performed at a high speed because each switch is not required to individually refer to the routing table by the use of the destination address.

In order to add the source routing information to the signaling packet 130, there are a first, a second, and a third adding approach which will now be described with reference to FIG. 2.

In FIG. 2(a), the first approach is illustrated as a first format 201. The first format 201 comprises a hop counter for counting the number of the switches passed and the source routing information represented by a combination of the port numbers. It is noted here that the hop counter and the source routing information may be arranged in various other manners. In FIG. 2(b), the second adding approach is illustrated as a second format 202. The second format 202 comprises the switch numbers and the port numbers in pairs. In FIG. 2(c), the third adding approach is illustrated as a third format 203. In the third format 203, upon passing through every switch, the port numbers are shifted or rotated so that the number of the current output port is always placed at a constant position in the list.

Referring back to FIG. 1, the source routing information for each destination address in the reference table 120 is monitored by a source routing information timer 121. The routing information timer 121 indicates the time duration from the last renewal of the source routing information to the current time instant. If the source routing information timer 121 is timed out for a particular destination address, the source routing information corresponding thereto is erased from the reference table 120.

Sometimes, the source routing information stored in the reference table 120 is not correct due to interruption or collision of any intermediate link on the route. If the transmission terminal 100 initiates the signaling operation in such a situation, the signaling packet can not be transferred to the reception terminal 101. The signaling operation is therefore unsuccessful. There are a first, a second, and a third solving approach to solve the above-mentioned problem. In the first solving approach, the switch detects the accident and requests other switches to invalidate the relevant portion of the reference table 120. In the second solving approach, the terminal detects that the communication is impossible, and carries out the signaling operation by a conventional hop-by-hop routing as described in the CCITT recommendation Q.93B. As described in the above-mentioned first specific step, the route is searched again to renew the reference table 120. In the third solving approach, the entry in the reference table 120 is monitored by the source routing information timer 121 and erased at a particular time interval. Every time when the entry is erased, the conventional hop-by-hop signaling operation is initiated and the source routing information is renewed. Thus, the same route is not used for a long time.

According to this signaling system, the reference table 120 is shared by all those terminals accommodated in the first-stage ATM switch 110. If the acquired route is registered in the reference table 120 of the first-stage ATM switch 110 with any one of those terminals connected to a particular destination terminal by the use of a normal signaling operation, all other terminals accommodated in the first-stage ATM switch 110 can readily carry out the signaling operation at a high speed. In other words, when any one of those terminals accommodated in the first-stage ATM switch 110 detects any change in the route, the source routing information is renewed. Thus, this signaling system is adaptive to variation in network structure of the connection-oriented packet network.

As mentioned above, when the switch has no source routing information, the conventional signaling operation is carried out. Simultaneously, the source routing information is acquired. On the other hand, when the source routing information is already obtained, the route is assigned at a high speed by the use of a source routing.

According to the signaling system, it becomes unnecessary for an intermediate switch to search the route in a complicated manner when the source routing information (represented by a combination of the port numbers of the output ports of the switches) is added to the signaling packet. Thus, the output ports can be directly designated. Accordingly, the processing time required to search the route can be reduced. The signaling operation requires the time for the VC assignment and the time for searching the route. As described above, the latter can be shortened.

The description will be directed to a signaling system according to a second embodiment of this invention.

At first, the outline of the signaling system will be described. At the start of a transmission, no source routing information exists for a destination address assigned to a reception terminal. In this event, a hop-by-hop signaling operation is carried out as described in the CCITT recommendation Q.93B with the reception terminal designated by the destination address. The source routing information obtained through the signaling operation is notified to the transmission terminal. Simultaneously, the source routing information is notified also to all other terminals accommodated in the same switch as the transmission terminal. Thereafter, the transmission terminal carries out the signaling operation with a signaling packet bearing the source routing information indicative of the route from the transmission terminal to the reception terminal. It is thus unnecessary for each intermediate switch to refer to the routing table using the destination address. Accordingly, selection of the route is performed at a high speed.

Figure 4:
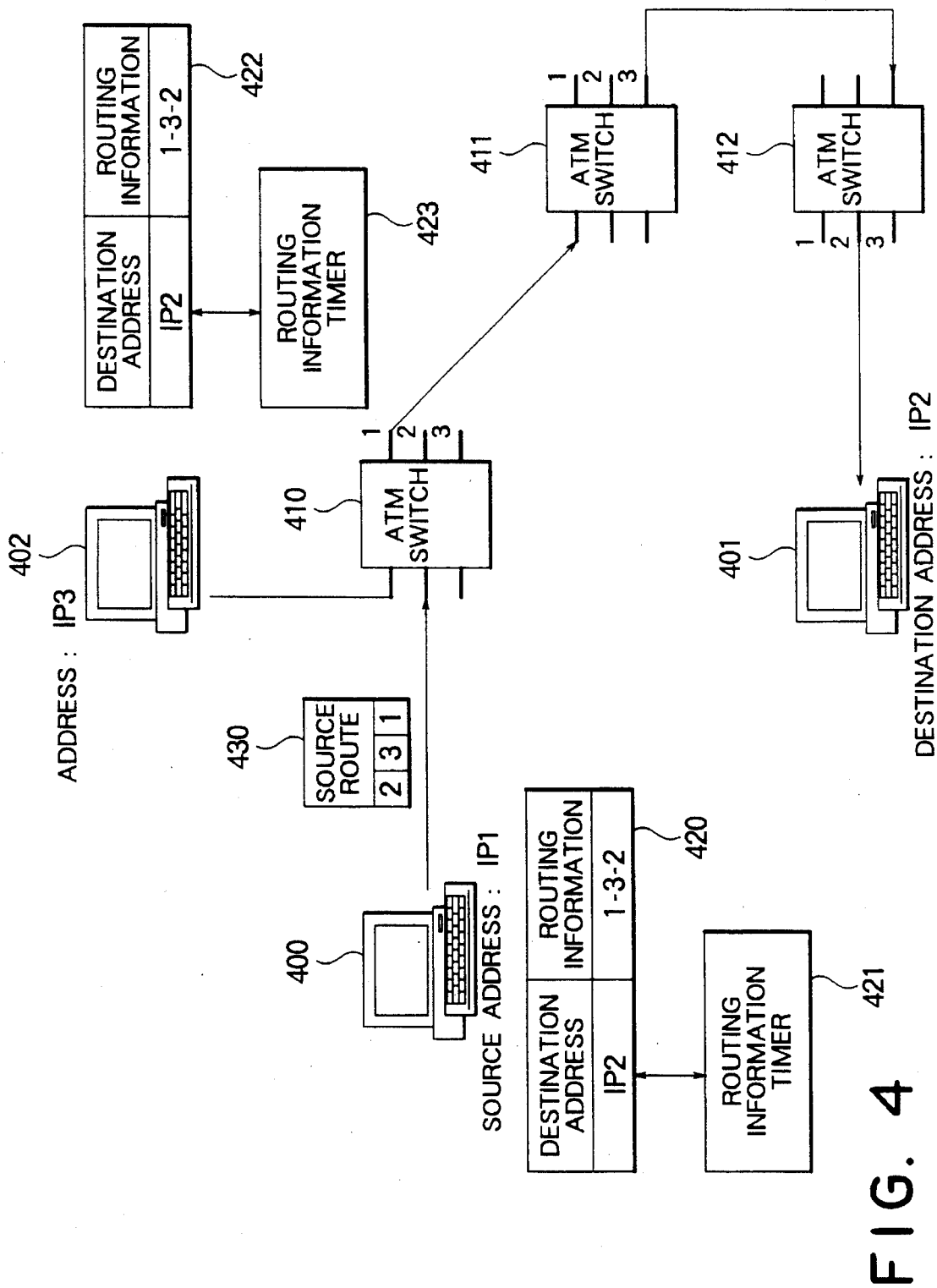
FIG. 4 is a view illustrating a signaling system according to a second embodiment of this invention.

Referring to FIG. 4, detailed description will be made as regards a packet transmission from a transmission terminal 400 having a source address IP1 to a reception terminal 401 having a destination address IP2, followed by another packet transmission from a transmission terminal 402 having an address IP3 to the reception terminal 401 having the destination address IP2. The transmission terminal 400 starts the signaling operation in absence of the virtual channel (VC) leading to the reception terminal 401. Specifically, the transmission terminal 400 has a reference table 420 indicating source routing information corresponding to destination addresses. Dependent upon whether or not the reference table 420 has the particular source routing information corresponding to the destination address IP2, the transmission terminal 400 carries out one of a first and a second particular step which will now be described with reference to FIG. 5.

FIRST PARTICULAR STEP

Figure 5:
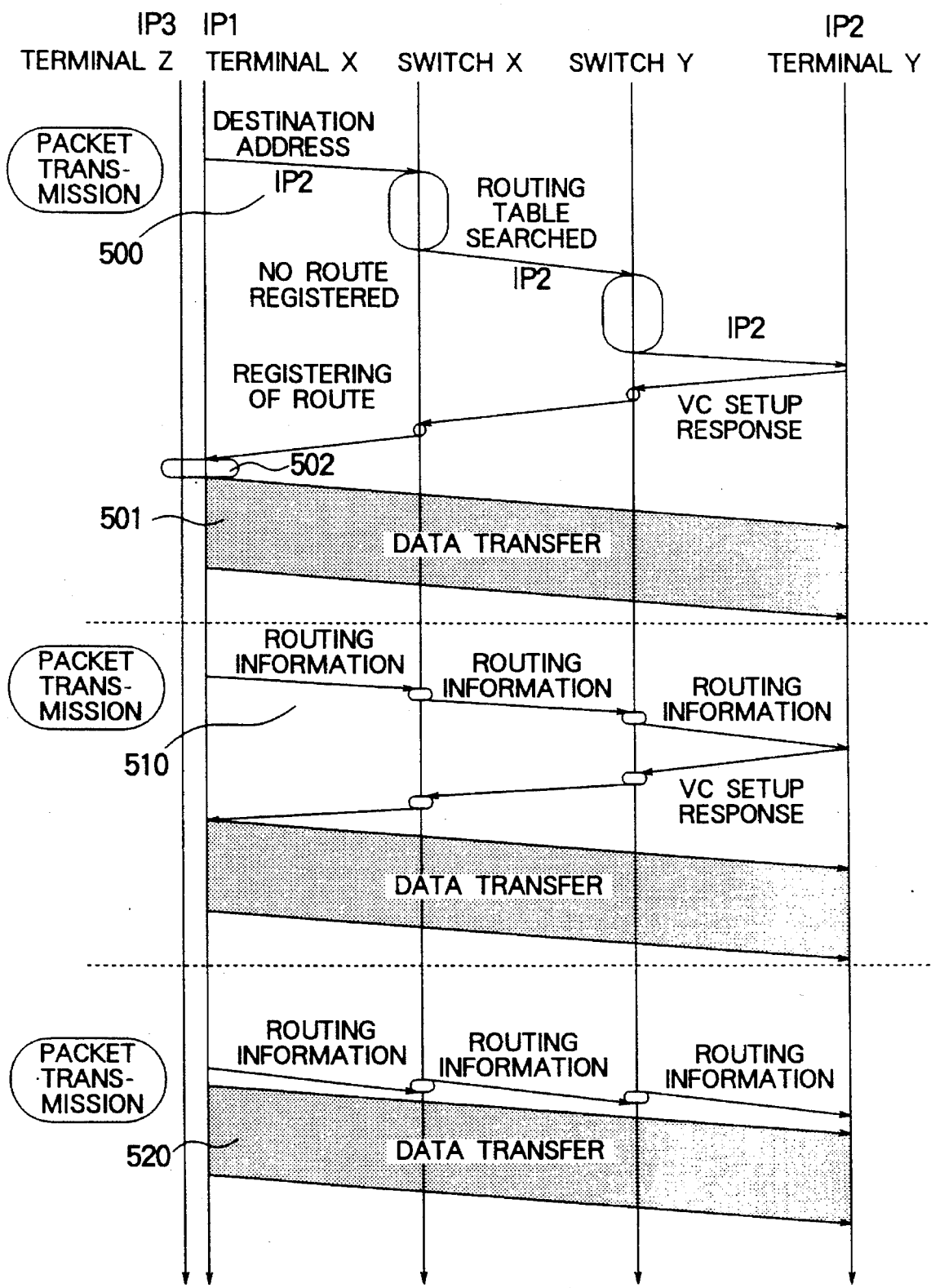
FIG. 5 is a flow chart for describing the signaling system illustrated in FIG. 4.

In FIG. 5, a packet flow chart 500 illustrates a case where the reference table 420 has no source routing information corresponding to the destination address IP2. In this event, the terminal 400 transmits to a first-stage ATM switch 410 a signaling packet 430 designating the destination address IP2. A conventional hop-by-hop routing is carried out according to the CCITT recommendation Q.93B to set up the virtual channel and the band for each of terminal-to-switch and switch-to-switch links. When the reception terminal 401 is reached, the VC setup response is produced and sent back to the transmission terminal 400. Thereafter, as indicated by a packet flow chart 501, the transmission terminal 400 transmits a data packet to the reception terminal 401 by the use of the virtual channel and the band thus assigned.

With the above-mentioned signaling operation, the source routing information is obtained. The source routing information indicates which physical output ports of the first-stage through the third-stage ATM switches 410, 411, and 412 are selected as the route from the transmission terminal 400 to the reception terminal 401. The source routing information is expressed in the form of a combination of port numbers of those output ports. Herein, the route successively passes through the port 1, the port 3, and the port 2 and the source routing information is represented as "1-3-2". The source routing information is written in a source routing information section in the reference table 420 of the transmission terminal 400 as illustrated in a packet flow chart 502. Simultaneously, the source routing information is written also in all other terminals accommodated in the first-stage ATM switch 410 in which the transmission terminal 400 is directly accommodated. For example, the source routing information is written in a reference table 422 of the terminal 402. Accordingly, the source routing information tables 420 and 422 always have the same content. Thus, every terminal can obtain the source routing information acquired as a result of communication of any other terminal. In this manner, the reference table can quickly provide the source routing information to a plurality of terminals.

There are a first and a second particular approach to acquire the source routing information indicating which output ports of which switches are successively passed. In the first particular approach, such output port information is acquired at each switch as a result of routing according to the hop-by-hop signaling operation as described in the CCITT recommendation Q.93B and is added to the signaling packet and transferred to the next switch where the signaling operation is continued. When the signaling packet is delivered to the reception terminal 401, the source routing information alone is sent back from the reception terminal 401.

In the second particular approach, after completion of the signaling operation from the transmission terminal 400 to the reception terminal 401, the output port information of the switches on the route is successively acquired along with an acknowledgement delivered from the reception terminal 401 to the transmission terminal 400. Thus, the source routing information is notified.

Second Particular Step

A packet flow chart 510 illustrates another case where the reference table 420 has the particular source routing information corresponding to the destination address IP2. In this event, the transmission terminal 400 produces a signaling packet 430 bearing the particular source routing information (for example, a list of the port numbers of the physical output ports of the switches) indicative of the route leading to the reception terminal 401 having the destination address IP2. The signaling packet 430 is delivered to the first-stage ATM switch 410. In this manner, selection of the route is performed at a high speed because each switch is not required to individually refer to the routing table by the use of the destination address. At the same time, the terminal 402 accommodated in the first-stage ATM switch 410 like the transmission terminal 400 also has the source routing information indicative of the route leading to the reception terminal 401 having the destination address IP2. Accordingly, when the terminal 402 acts as a transmission terminal, selection of the route can be performed at a high speed without referring to the routing table.

In the packet flow chart 510, selection of the route is performed at a relatively high speed. A further improvement is achieved in a packet flow chart 520. As such an improvement, a self VC setup method is described in the paper entitled "ATM-LAN Protocol Architecture -ATOM LAN-" contributed by Iwata et al to the Information Network Conference held in Tokyo on Feb. 26, 1993 by the Institute of Electronics, Information, Communication Engineers of Japan (Technical Report of IEICE, IN92–109 (1993-02), pages 7 to 12). A combination of the self VC setup method and the signaling system depicted by the packet flow chart 510 makes it possible to start data transmission simultaneously when a virtual channel is assigned at a first-stage switch. Thus, even in a multi-stage switch environment, no transmission delay is caused. Therefore, it is possible to considerably reduce the processing delay. In other words, both of the VC assignment time and the route searching time required for signaling can be reduced to thereby achieve a fast signaling system. In addition, the structure is readily implemented by hardware.

Figure 2:
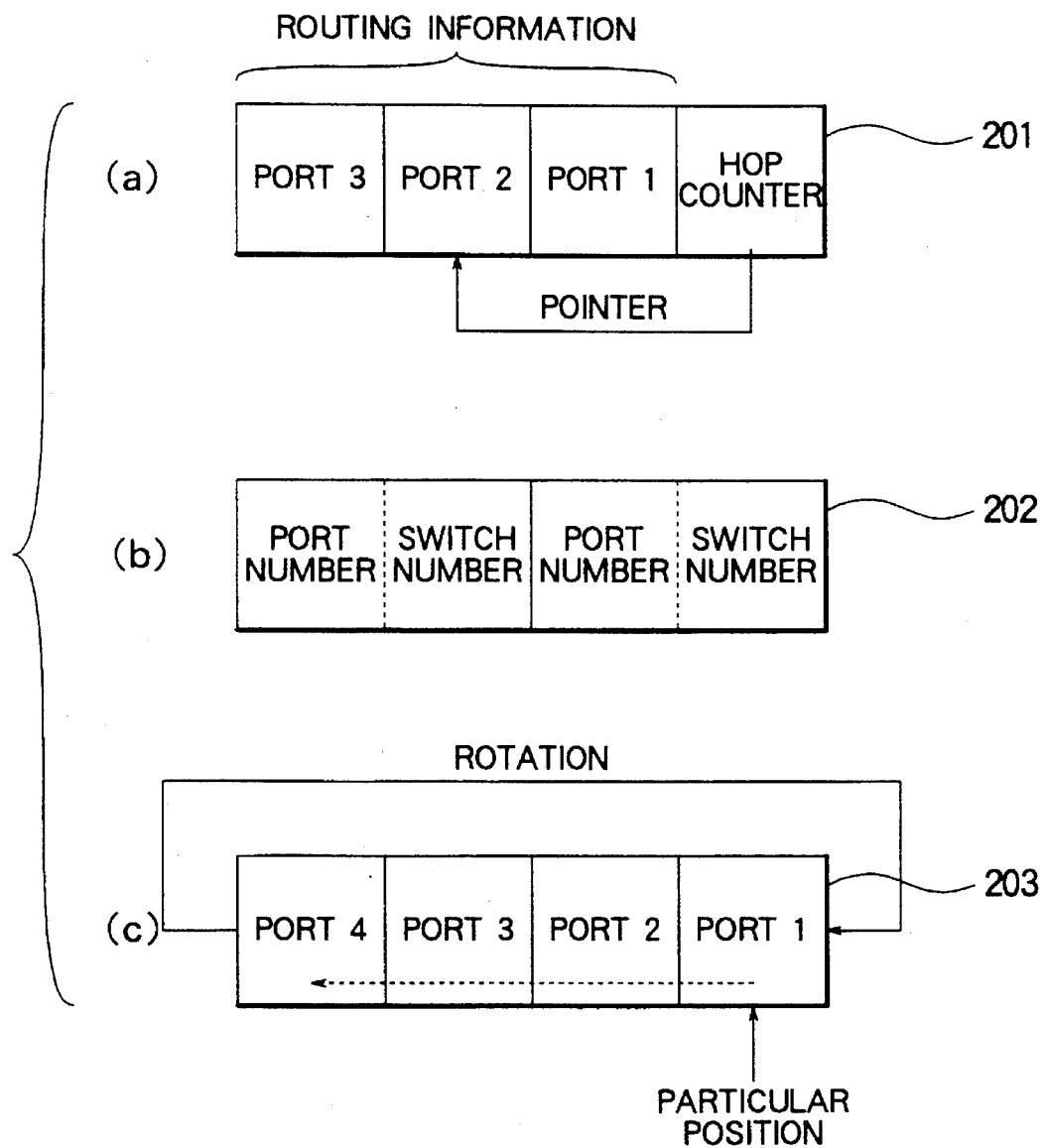
FIG. 2 is a view illustrating various formats of source routing information.

The source routing information can be added to the signaling packet in the manner similar to that described in conjunction with FIG. 2.

Furthermore, the source routing information for each destination address in the reference tables 420 and 422 is monitored by each of source routing information timers 421 and 423. Each of the source routing information timers 421 and 423 indicates the time duration from the last renewal of the source routing information to the current time instant. If each of the source routing information timers 421 and 423 is timed out for a particular destination address, the source routing information concerned therewith is erased from each of the reference tables 420 and 422.

Sometimes, the source routing information stored in each of the reference tables 420 and 422 is not correct due to interruption or collision of any intermediate link on the route. If the transmission terminal 400 initiates the signaling operation in such a situation, the signaling packet can not be transferred to the reception terminal 401. The signaling operation is therefore unsuccessful. There are a first, a second, and a third specific approach to solve the above-mentioned problem. In the first specific approach, the switch detects the accident and requests the terminals to invalidate the relevant portion of the reference tables 420 and 422. In the second specific approach, the terminal detects that the communication is impossible, and carries out the signaling operation by the conventional hop-by-hop routing as described in the CCITT recommendation Q.93B. As described in the above-mentioned first particular step, the route is searched again to renew the reference tables 420 and 422. In the third specific approach, the entry in the reference tables 420 and 422 is monitored by each of the source routing information timers 421 and 423 and erased at a particular time interval. Every time when the entry is erased, the conventional hop-by-hop signaling is initiated and the source routing information is renewed. Thus, the same route is not used for a long time.

According to this signaling system, the reference tables 420 and 422 are always shared by all those terminals accommodated in the first-stage ATM switch 410. If the acquired route is registered in the reference tables 420 and 422 with any one of those terminals connected to a particular destination terminal by the use of the normal signaling operation, all other terminals accommodated in the first-stage ATM switch 410 can readily carry out the signaling operation at a high speed. In other words, when any one of those terminals accommodated in the first-stage ATM switch 410 detects any change in the state of the route, the source routing information is renewed. Thus, this signaling system is adaptive to variation in the network structure.

As mentioned above, when the terminal has no source routing information, the conventional signaling operation is carried out and the source routing information is simultaneously acquired. On the other hand, when the source routing information is already obtained, the route is assigned at a high speed by the use of the source routing.

According to the signaling system, it becomes unnecessary for an intermediate switch to search the route in a complicated manner when the source routing information (represented by a combination of the port numbers of the output ports of the switches) is added to the signaling packet. Thus, the output ports can be directly designated. Accordingly, the processing time required to search the route can be reduced. The signaling operation requires the time for the VC assignment and the time for searching the route. As described above, the latter can be shortened.

Figure 6:
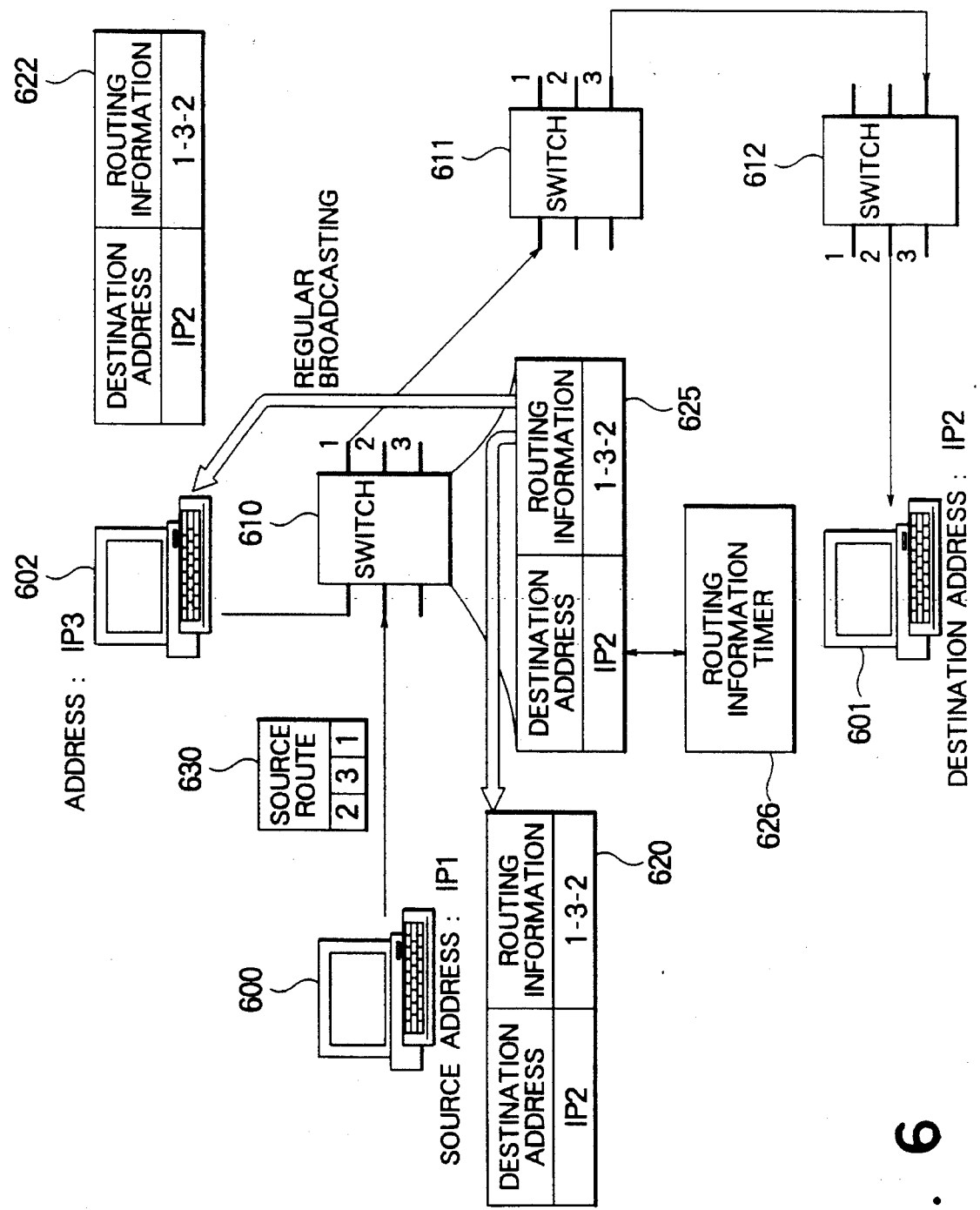
FIG. 6 is a view illustrating a signaling system according to a third embodiment of this invention.

Turning to FIG. 6, the description will be made as regards a signaling system according to a third embodiment of this invention. The signaling system is similar to that described in conjunction with FIG. 4 except how to use the reference table. Once the terminal acquires the reference table, it is possible to perform the signaling operation by the source routing from the transmission terminal to the reception terminal. The description will be made as regards a different portion alone.

At the start of the transmission, there is no source routing information corresponding to the destination address. In this event, the reception terminal is designated by the destination address. In addition, the hop-by-hop signaling operation is carried out as described in the CCITT recommendation Q.93B in the manner similar to that described in conjunction with FIG. 4. The source routing information obtained through the signaling operation is written into a reference table 625 in a first-stage ATM switch 610. A copy of the reference table may be distributed to all other terminals accommodated in the first-stage ATM switch 610 at every renewal of the content of the reference table 625 or at a given time interval. Therefore, the transmission terminal carries out the signaling operation with the signaling packet bearing the source routing information indicative of the route from the transmission terminal to the reception terminal. It is thus unnecessary for each intermediate switch to refer to the routing table using the destination address. Accordingly, selection of the route is performed at a high speed. A single source routing information timer 626 is provided for the reference table 625 of the first-stage ATM switch 610. Since each of the terminals receives a copy of the reference table in the switch, the timer is unnecessary in each of the terminals.

Such use of the reference table is advantageous as will now be described. It is assumed that a new terminal is connected to the first-stage ATM switch 610 and started. To acquire the source routing information already possessed by the terminals 600 and 602, the new terminal would simply receive a copy of the reference table 625 in the first-stage ATM switch 610. Thus, the reference table is easy to manage as compared with the second embodiment where it is difficult for the new terminal to obtain the same source routing information.

According to the signaling system, it becomes unnecessary for the intermediate switch to search the route in the complicated manner when the source routing information (represented by a combination of the port numbers of the output ports of the switches) is added to the signaling packet. Thus, the output ports can be directly designated. Accordingly, the processing time required to search the route can be reduced. The signaling operation requires the time for the VC assignment and the time for searching the route. As described above, the latter can be shortened.

Figure 7:
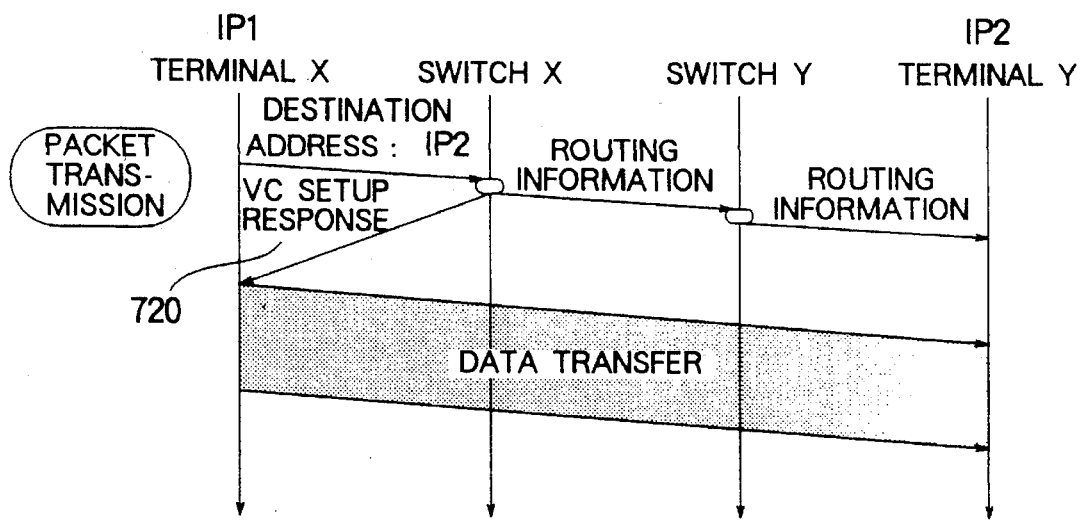
FIG. 7 is a flow chart for describing a signaling system according to a fourth embodiment of this invention.

Turning to FIG. 7, the description will be made as regards a signaling system according to a fourth embodiment of this invention. The signaling system aims to increase the operation speed as illustrated in a packet flow chart 720 and uses a combination of the self VC setup method and the signaling system depicted by the packet flow chart 310 described in conjunction with FIG. 3. The signaling system makes it possible to start data transmission or transfer simultaneously when a VC setup completion signal is received from the first-stage switch. Thus, even in a multi-stage switch environment, no transmission delay is caused. If no acknowledgement is received from the switch, the conventional hop-by-hop signaling operation is carried out according to the CCITT recommendation Q.93B.

Figure 8:
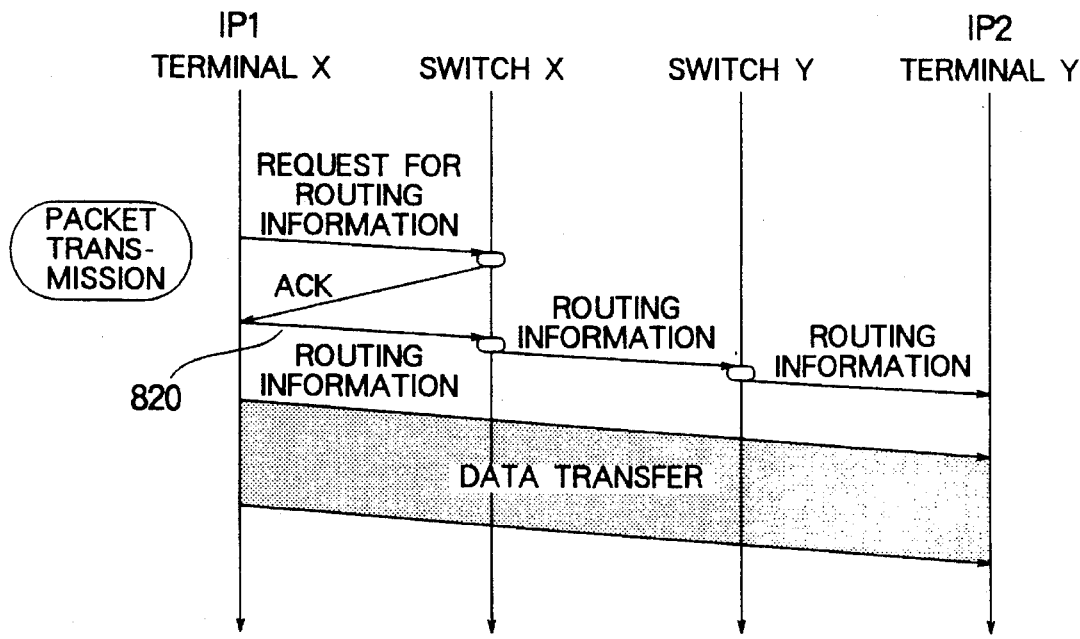
FIG. 8 is a flow chart for describing a signaling system according to a fifth embodiment of this invention.

Turning to FIG. 8, the description will be made as regards a signaling system according to a fifth embodiment of this invention. Like the signaling system described in conjunction with FIG. 7, use is made of a combination of the self VC setup method and the signaling system depicted by the packet flow chart 310 described in conjunction with FIG. 3. Instead of conversion of the destination address of the signaling packet into the source routing information at the first-stage switch nearest from the transmission terminal, the first-stage switch is requested to provide the source routing information when the transmission terminal starts the signaling operation in the signaling system. As soon as the request is met, the data transmission can be immediately started using the source routing information thus acquired. Accordingly, even in the multi-stage switch environment, no transmission delay is caused. If the switch has no source routing information, the conventional hop-by-hop signaling operation is carried out according to the CCITT recommendation Q.93B.

As described above, it is possible according to this invention to solve the problem of the connection delay in the conventional signaling system according to the CCITT recommendation Q.93B and to achieve a fast signaling operation.

What is claimed is:

1. A system for executing a signaling operation of a setup for a virtual channel which is used for communication between a transmission side and a reception terminal in a connection-oriented packet network, wherein said system comprises:

information acquiring means for acquiring source routing information relating to a source route path between said transmission side and said reception terminal; and signaling carrying out means connected to said information acquiring means for carrying out said signaling operation with reference to said source routing information to form said virtual channel from said transmission side to said reception terminal.

2. A system as claimed in claim 1, wherein said system further comprises:

a reference table connected to said information acquiring means for memorizing said source routing information together with a destination address of said reception terminal;

producing means for producing a first signaling packet having said destination address:

transforming means connected to said reference table and said producing means for transforming said first signaling packet into a second signaling packet by referring to said reference table, wherein said second signaling packet has said source routing information; and transmitting means connected to said transforming means for transmitting said second signaling packet towards said reception terminal with reference to said source routing information.

3. A system as claimed in claim 2, wherein said transmitting means transmits said second signaling packet towards said reception terminal in accordance with said destination address when source routing information corresponding to said destination address does not exist in said reference table.

4. A system as claimed in claim 2, wherein said transmission side of said system comprises:

a transmission terminal; and a first switch between said transmission terminal and said reception terminal, wherein said first switch produces a setup completion signal in response to said first signaling packet, and wherein said transmission terminal comprises means for starting data transfer in response to said setup completion signal.

5. A system as claimed in claim 1, wherein said system further comprises:

a reference table connected to said information acquiring means for memorizing said source routing information together with a destination address of said reception terminal;

producing means connected to said reference table for producing a transferred signaling packet with reference to said source routing information, wherein said transferred signaling packet has said destination address; and transmitting means connected to said producing means for transmitting said transferred signaling packet towards said reception terminal in accordance with said destination address when source routing information corresponding to said destination address does not exist in said reference table.

6. A system as claimed in claim 5, wherein said transmission side comprises:

a transmission terminal; and a switch between said transmission terminal and said reception terminal, wherein said transmission terminal produces an original signaling packet, wherein said producing means is connected to said transmission terminal and processes said original signaling packet into said transferred signaling packet with reference to said source routing information.

7. A system as claimed in claim 1, wherein said transmission side comprises:

a plurality of transmission terminals; and a first switch between each of said transmission terminals and said reception terminal, wherein said signaling carrying out means is included in each of said transmission terminals.

8. A system as claimed in claim 7, wherein said system further comprises:

a plurality of switches connected between said transmission terminals and said reception terminal, wherein said plurality of switches includes said first switch and comprises said information acquiring means, and wherein at least said first switch comprises information transmitting means, which is connected to said information acquiring means, for transmitting said source routing information from said information acquiring means to said signaling initiation means of each of said transmission terminals.

9. A system as claimed in claim 8, wherein at least said first switch further comprises:

starting means connected to said information transmitting means for starting operation of said information transmitting means at a time when said information acquiring means acquires said source routing information.

10. A system as claimed in claim 8, wherein each of said transmission terminals further comprises generating means for generating a request signal for requesting said signaling operation and wherein said first switch further comprises starting means connected to said information transmitting means and said generating means for starting operation of said information transmitting means in response to said request signal.

11. A method of executing a signaling operation of a setup for a virtual channel which is used for communication between a transmission side and a reception terminal in a connection-oriented packet network, wherein said method comprises steps of:

acquiring source routing information relating to a source route path between said transmission side and said reception terminal; and carrying out said signaling operation with reference to said source routing information to form said virtual channel from said transmission side to said reception terminal.

\* \* \* \* \*